April 30, 1935.  J. R. SNYDER  1,999,307

SHOCK ABSORBER

Filed Jan. 2, 1931  3 Sheets-Sheet 1

Inventor
Jacob R. Snyder.
Rivers Hudson & Kent
attys.

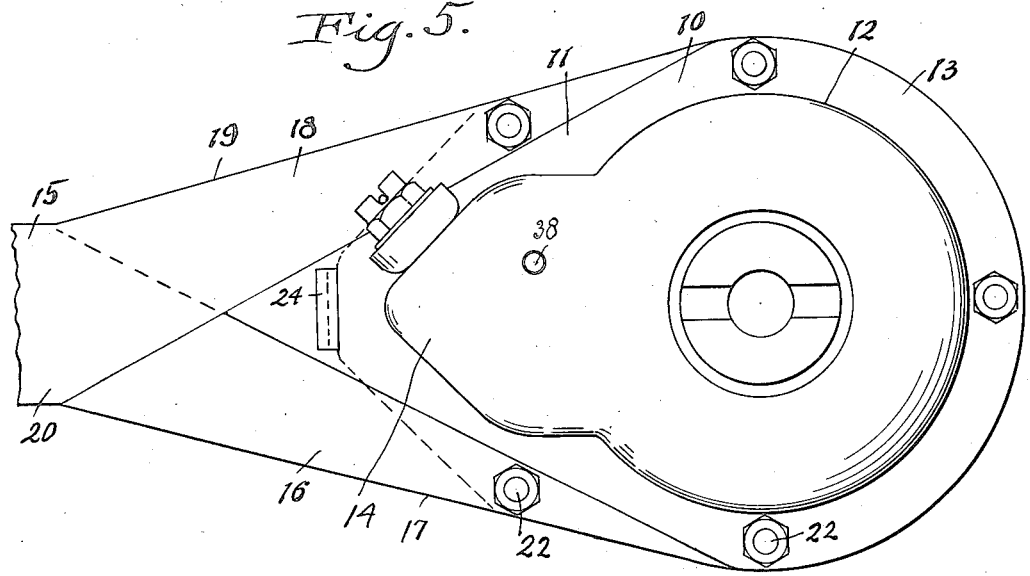
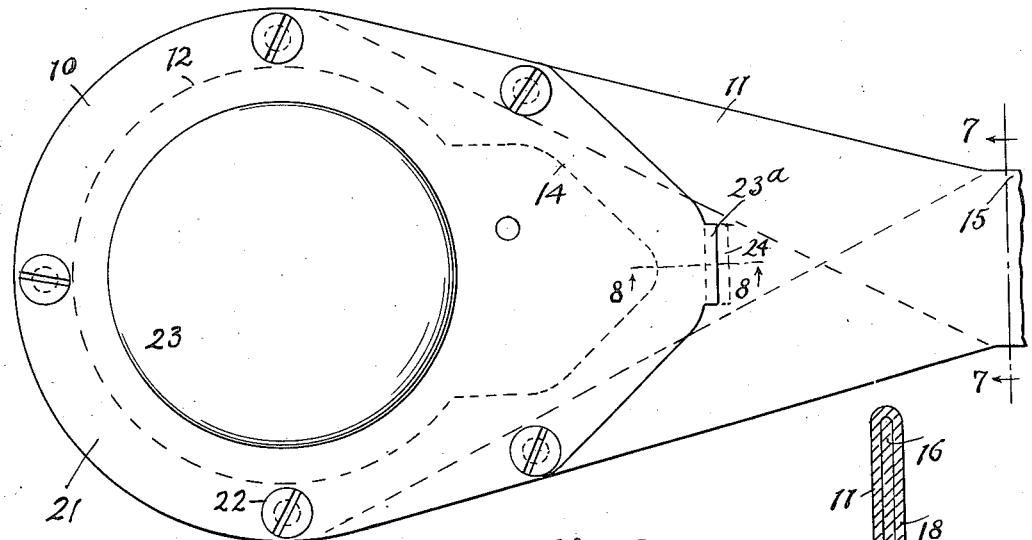
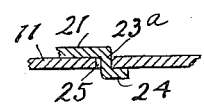

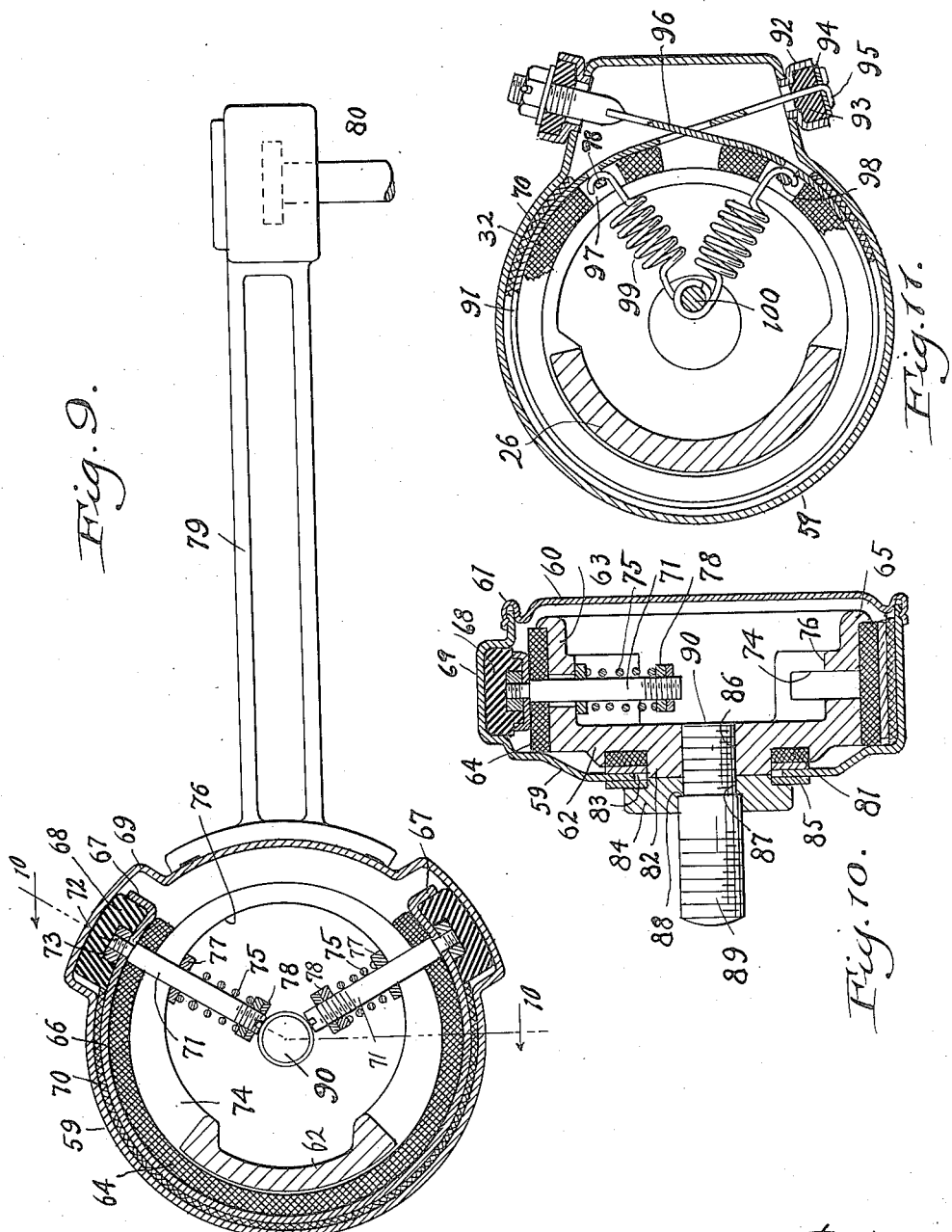

Patented Apr. 30, 1935

1,999,307

UNITED STATES PATENT OFFICE 1,999,307

SHOCK ABSORBER

Jacob R. Snyder, Mount Lebanon, Pa.

Application January 2, 1931, Serial No. 506,064

11 Claims. (Cl. 188—130)

This invention relates to shock absorbers of the two way frictionally resisting type which are adapted for use in connection with motor vehicles and the like.

The primary object of the invention is to provide a shock absorber of the type referred to which is simple in construction, efficient in operation, and inexpensive to manufacture.

Another object of the present invention is to provide a shock absorber of the type referred to which is capable of offering progressively increasing resistance between relatively movable members in opposite directions.

A further object of the present invention is to provide means for creating the desired initial friction between friction members movable relatively in opposite directions, to offer the desired progressively increasing resistance to the movement of the said members in opposite directions.

Another object of the present invention is to provide a shock absorber of the type referred to wherein means is provided for relative adjustment between the relatively movable friction members due to wear.

With the objects above indicated and other objects hereinafter explained in view, the invention consists in the construction and combination of elements hereinafter described and claimed.

Referring to the drawings.

Fig. 5 is a rear elevational view of the housing of the shock absorber.

Fig. 6 is a front elevational view of the same.

Fig. 7 is a transverse sectional view taken on line 7—7 of Fig. 6.

Fig. 8 is a fragmentary sectional view taken on line 8—8 of Fig. 6.

Fig. 9 is a longitudinal sectional view of a shock absorber showing a modification of the invention.

Fig. 10 is a transverse sectional view taken on line 10—10 of Fig. 9.

Fig. 11 is a longitudinal sectional view of a shock absorber showing a modification of the invention.

Figure 1:
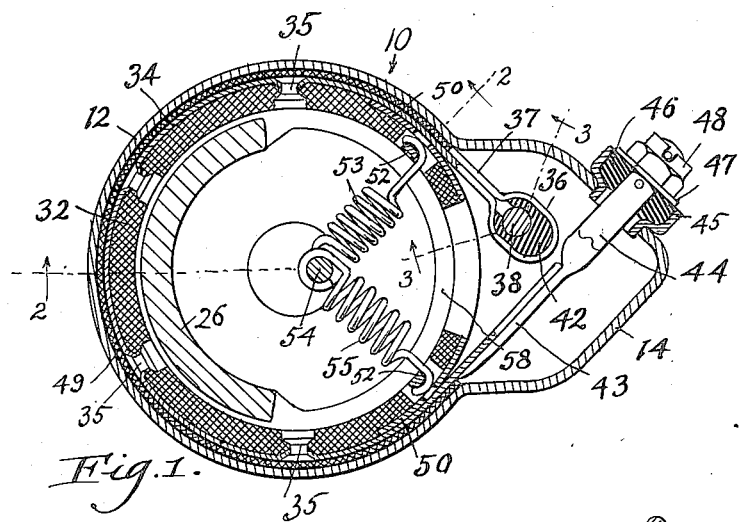
Figure 1 is a longitudinal sectional view of a shock absorber embodying the present invention.
Figure 2:
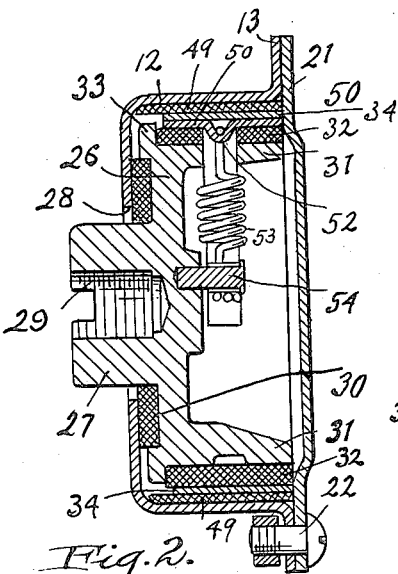
Fig. 2 is a transverse sectional view taken on line 2—2 of Figure 1.

In the drawings 10 represents generally a shock absorber of the two way frictionally resisting type which is adapted to be attached between relatively movable parts such as the spring and chassis of a motor vehicle to effectively resist the movement therebetween in opposite directions, commonly called the compression stroke and the rebound stroke.

The shock absorber housing is made from a piece of flat steel of the desired gauge and cut to the desired contour so that by suitable stamping operations the same may be formed into a combined housing and integral arm. The flat sheet 11 at one end is substantially circular and has a depressed cup-shaped portion 12 provided therein and disposed inside of the circular edge portion of the plate to thereby provide a circumferentially extending flange 13. The cup-shaped housing 12 is drawn out at one side to provide a nose portion 14 for a purpose to be later described.

The arm portion 15 is formed by bending one edge portion 16 of the plate 11 along the line 17 and into engagement with the adjacent surface of the plate 11 while the edge portion 18 of the plate 11 is bent along the line 19 and into engagement with the adjacent surface of the plate 11 and the edge portion 16 as clearly shown in Figs. 5 and 7. These edge portions 16 and 18 are bent along converging lines and then extend forwardly for any suitable distance to provide a reinforced extension 20 adapted to be connected by means of the customary link, not shown, to the spring of the motor vehicle while the housing is rigidly secured to the chassis of the motor vehicle. A cover plate 21 of a shape complementary to the cup-shaped housing 12 is attached to the flange 13 by bolts 22 and has a raised portion 23 disposed above the cup-shaped housing 12 for a purpose to be later described. The cover plate 21 adjacent the nose portion 14 has a depending integral extension 23a and a laterally extending integral tongue 24 which extends through a transverse slot 25 in the plate 11 so that the tongue 24 will normally engage the under surface of the plate 11 and maintain the cover plate 21 in its proper position as clearly shown in Fig. 8.

A stationary drum 26 in the form of a casting is normally disposed within the cup-shaped housing 12 and has an axial extension 27 extending through an opening 28 provided in the closed end of the cup-shaped housing 12. This extension 27 is adapted to be connected to the chassis of the motor vehicle by means of a bolt not shown engageable with the interiorly screw threaded bore 29 provided in the adjacent end of the extension 27. A thrust ring 30 of fabric or other suitable material is secured within a recess in one face of the drum 26 and is normally in engagement with the adjacent surface of the enclosed end of the cup-shaped housing 12.

The drum 26 has a laterally extending circular flange 31 preferably formed integral therewith with which cooperates a friction band 32 of brake lining or other suitable material, which is prevented from relative lateral movement thereon by a circumferentially extending flange 33 formed integral with the drum 26. The cover plate 21 also engages the friction band 32 along the edge opposite to that engaged by the flange 33.

Figure 3:
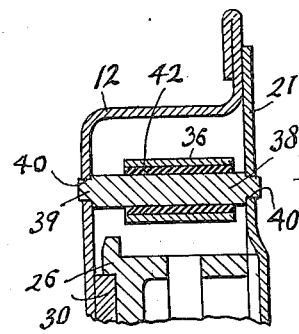
Fig. 3 is a fragmentary transverse sectional view taken on line 3—3 of Figure 1.

A flexible steel band 34 surrounds the friction band 32 and is secured thereto by a plurality of rivets 35 at spaced intervals, but in such a manner as to leave a substantial portion of the ends of the friction band 32 relatively free. One end of the flexible band 34 is looped at 36 and the free end 37 extends back a suitable distance in engagement with the adjacent portion of the flexible band 34. This looped end 36 is disposed around a transversely extending pin 38 which has its opposite ends reduced at 39 and disposed within aligned openings 40 provided respectively in the closed end portion of the cup-shaped housing 12 and the cover plate 21 as clearly shown in Fig. 3. A rubber sleeve 42 is interposed between the pin 38 and the looped end 36 to prevent metal to metal contact, thus eliminating noise and at the same time to permit a certain amount of flexibility. The opposite end of the flexible band 34 is connected to an extension 43 which is an integral part of an adjusting screw 44. A cup-shaped support 45 is secured within an opening of the upper portion of the enclosing flange of the housing 12 upon the nose portion 14 so as to permit the adjusting screw 44 to extend therethrough for adjustment upon the outside of the housing 12. A rubber collar 46 is interposed between the cup-shaped support 45 and the adjusting screw 44 to prevent metal to metal contact and a washer 47 which surrounds the adjusting screw 44 normally engages the outer surface of the rubber collar 46. Adjustment of the flexible steel band 34 and consequently of the friction band 32 is provided by means of a nut 48 which engages the extended screw threaded end of the adjusting screw 44. This adjustment is normally provided as a slack take-up means for the friction band 32 due to wear occasioned by the relative movement between the friction band 32 and the flange 31 of the drum 26.

A band 49 of brake lining or other suitable material is disposed within the cup-shaped housing 12 and lies between the enclosing flange and the flexible steel band 34 to prevent metal to metal contact therebetween. It will be seen therefore that the construction so far described provides for an oscillatory housing which has no bearing or support other than the support afforded by the stationary drum, the construction being what is commonly known as the bearingless type of rotatable drum.

It being the object of the present invention to provide a shock absorber offering progressively increasing frictional resistance in opposite directions between the relative movement of the friction members, preferred means are herein illustrated, but it should be understood that any suitable means may be employed for attaining the desired result.

The free ends of the friction band 32 have secured in their outer surfaces pressure distributing plates 50. Directly beneath these plates the friction band has transverse openings 51 through which projects depressed portions 52 which provide suitable eyes or attaching means. A spring 53 has one end connected to the eye 52 of the pressure distributing plates 50 while the opposite end is connected to a pin 54 secured in the stationary drum 26 at a point eccentric with respect to the fixed axis of the drum and exerts a pressure upon the free end of the friction band 32 to which it is attached which offers a progressively increasing frictional resistance to the movement thereof in one direction, as shown upon the compression stroke. A second spring 55 has one end connected to the eye 52 on the pressure distributing plate 50 associated with the other free end of the friction band 32 while the opposite end is connected to the pin 54 and exerts a pressure upon the free end of the friction band 32 to which it is attached, which offers a progressively increasing frictional resistance to the movement thereof in one direction, as shown upon the rebound stroke. These springs 53 and 55 respectively preferably exert different pressures upon the free ends of the friction band 32 or in other words create different frictional resistances between the friction band 32 and the drum 26. This has been found desirable inasmuch as different degrees of resistance are required for the compression stroke and the rebound stroke.

In order to permit the ends of the springs 53 and 55 to move with the free ends of the friction band 32 a transverse slot 58 is provided which extends a suitable distance around the periphery of the flange 31 of the stationary drum 26.

Figure 4:
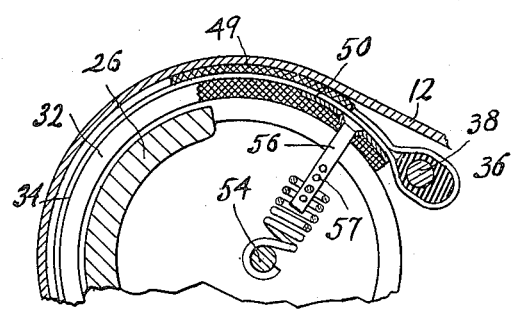
Fig. 4 is a fragmentary longitudinal sectional view of a shock absorber showing a modification of the invention.

Instead of employing springs normally exerting different pulls upon the free ends of the friction bands such as the springs 53 and 55 the same result may be obtained by providing an adjustment such as shown in Fig. 4 wherein a pin 56 is connected to the pressure distributing plate 50 and is provided upon its inner end with a plurality of openings 57 to which one end of the spring is adjustably connected. With this construction it is possible to use similar springs and obtain different initial frictional resistances for the compression stroke and rebound stroke.

It will be readily understood therefore in the operation of the device that progressively increasing frictional resistance is offered between the relative movement of the friction band and the stationary drum in one direction due to the eccentric pull afforded by the springs. It is also to be noted that the relative movement is frictionally resisted throughout substantially the entire surface of the friction band 32 due to the normal tendency of the friction band to wrap itself about the drum during movement in one direction and the greater the pull exerted by the springs upon the free ends of the friction member the greater will be the resistance offered to the relative movement.

Referring to Fig. 1 in the operation of the shock absorber we will assume that the housing 12 and brake lining 32 are moved in a counterclockwise direction from the normal or neutral position shown therein. Progressively increasing frictional resistance is offered during the counterclockwise movement of these members to its maximum point of travel and the frictional resistance offered is effective throughout the entire contacting surface of the friction band 32. It is to be pointed out that during this relative movement the spring 55 offers practically no resistance to the movement of the friction band as the pull upon the friction band is from a point adjacent this position. Immediately upon a reverse movement of the housing and friction band 32 or in a clockwise direction the spring 53 becomes ineffective and the spring 55 effective to offer progressively increasing resistance to the movement of the housing and friction band in this direction due to the pressure exerted by the spring 55 upon the end of the friction band 32 which now becomes the following end as the pull upon the friction band 32 is now applied adjacent the spring 53. It will be seen therefore that progressively increasing frictional resistance is offered to the relative movement between the friction band 32 and the stationary drum 26 at all times in both directions.

In Figs. 9 and 10 I have shown a modified form of the invention but involving the same principle of operation, the main difference residing in the use or provision of a cam or eccentric surface with which the springs or pressure creating means cooperate to offer progressively increasing resistance between the relatively movable members in opposite directions. In this construction the shock absorber comprises a cup-shaped housing 59 formed of sheet metal by a stamping operation and has a cover plate 60 of substantially the same shape as the housing 59 and is provided with a U-shaped circumferentially extending flange 61 which receives the free edge portion of the cup-shaped housing and is securely attached thereto as shown in Fig. 10.

A stationary drum 62 is normally disposed within the cup-shaped housing 59 with its stationary axis concentric with the axis of the oscillatory housing and has a laterally extending circular flange 63 the outer peripheral surface of which engages a friction band 64 of brake lining or other suitable material. The laterally extending flange 63 adjacent one edge has a circumferentially extending flange 65 which provides an abutment for one edge of the friction band 64 while the opposite edge abuts the enclosed end of the cup-shaped housing 59 thus preventing any relative lateral movement between the friction band 64 and the flange 63.

A flexible steel band 66 encircles the friction band 64 and tends to maintain the friction band in engagement with the peripheral surface of the flange 63. The free ends of the steel band 67 are bent laterally outwardly and provide abutments for rubber blocks 68 which are normally disposed in cup-shaped extensions 69 formed integral upon substantially opposite portions of the enclosing flange of the housing 59, this being clearly shown in Figs. 9 and 10. The edges of the rubber blocks 68 opposite to the extension 67 are in normally close proximity with one wall of the cup-shaped extensions 69 while a space is provided between the laterally extending flange 67 and the adjacent wall of the cup-shaped extensions 69 to thus permit slight oscillatory movement of the housing 59 without material resistance. A band 70 of brake lining or other suitable non-metallic material is disposed between the enclosing flange of the drum 59 and the steel band 66 to prevent metal to metal contact between these members and has its ends terminating adjacent the rubber blocks 68.

Adjacent the free ends of the friction band 64 are radially disposed pins 71 which have their outer ends extending through openings in the ends of the friction band and reduced portions which extend through aligned openings in the flexible steel band 66. The reduced ends 72 are screw threaded and cooperate with nuts 73 which are secured in the inner faces of the rubber blocks 68 to rigidly clamp the offset portions of the pins in engagement with the steel band 66. These pins 71 extend inwardly through a transverse slot 74 which extends part way around the circumference of the flange 63 and are provided with coiled springs 75 which encircle the pins 71. The inner surface 76 of the extension 63 is eccentric with respect to the axis of the stationary drum 62 the axis of the eccentric surface being in a horizontal plane with respect to the axis of the drum 62. Shoes 77 are freely mounted upon the pins 71 and are maintained in engagement with the eccentric surface 76 by means of the springs 75. The tension of the springs 75 may be varied by adjusting nuts 78 which screw threadedly engage the screw threaded free ends of the pins 71.

These springs 75 are employed to create any desired initial pressure upon the free ends of the friction band 64 and it has been found desirable to provide different degrees of initial pressures for the compression stroke and the rebound stroke. It will be seen that with this arrangement such degrees of initial pressures may be readily obtained inasmuch as one of the springs 75 may be adjusted to obtain the desired initial pressure for the compression stroke while the other spring 75 may be adjusted to obtain the desired initial pressure for the rebound stroke.

The operation of the device is comparatively simple. After the springs 75 have been adjusted so as to obtain the desired initial pressure between the free ends of the friction band 64 and the outer peripheral surface of the flange 63 oscillatory movement of the housing 59 in one direction will cause one of the shoes 77 to ride about the eccentric surface 76 thus compressing the associated spring 75 and increasing the force applied to the associated end of the friction band 64. Frictional resistance is offered to this movement over the entire surface of the friction band 64 due to the tendency of the friction band 64 to wrap itself about the peripheral surface of the flange 63. During this movement the other shoe 77 moves about the decreasing portion of the eccentric surface 76 thus decreasing the pressure upon the associated end of the friction band 64 so as not to offer any appreciable resistance to the movement between the friction band 64 and peripheral surface of the flange 63 at this point. Upon oscillatory movement of the housing 59 in the opposite direction just the reverse operation of these springs and their associated shoes 77 takes place so as to offer resistance to the movement in this direction. It will be seen therefore that with this construction a progressively increasing frictional resistance is offered to the relative movement between the friction band 64 and the peripheral surface of the flange 63 in opposite directions.

An arm 79 is attached to the housing 59 preferably between the extensions 69 and has its outer end adapted for connection with one end of a link 80 while the opposite end not shown is connected in the usual manner to the spring of the motor vehicle.

The stationary drum 62 carries a thrust ring 81 which engages the inner surface of the enclosed end of the drum 59. The stationary drum 62 is further provided with an axial extension 82 which projects through an opening 83 in the enclosed end of the housing 59. A member 84 cooperates with the extension 82 and has disposed between it and the adjacent surface of the enclosed end of the drum 59 a washer 85. A screw threaded bore 86 is provided in the drum 63 and aligns with a transverse opening 87 in the member 84 which has an offset portion forming a shoulder 88. A bolt 89 for attaching the shock absorber to the chassis of the motor vehicle is provided and has a reduced screw threaded end 90 which cooperates with the screw threaded bore 86 so as to rigidly maintain the member 84 in engagement with the extension 82 by engagement between the offset shoulder 88 and the offset portion on the bolt 89.

Referring to Fig. 11 I have shown a further modification of the invention over that shown in Fig. 1 wherein the free ends of the friction band 32 are brought into closer proximity and the pressure distributing plates 50 employed in Fig. 1 eliminated. The same effect is obtained however by employing a flexible steel band 91 and extending the free ends thereof past the free ends of the friction band 32 so as to effect a substantially even pressure upon the free ends of the friction band. One end of the band 91 may extend through an opening in the housing within which is secured a cup-shaped member 92 having disposed therein a rubber collar 93. A washer 94 engages the outer surface of the rubber collar 93 and aligned openings are provided in the rubber collar 93 and washer 94 through which the end of the band 91 extends. It may be secured in any desirable manner but in the present instance the end is split longitudinally and the portions bent in opposite directions to provide locking extensions 95. The opposite end of the band 91 is connected in a manner similar to the manner in which the band 34 is attached in Fig. 1. In order to permit the free ends of the band 91 to pass each other, one end is reduced so as to extend through an opening 96 provided in the opposite end at the point of crossing.

The free ends of the friction band 32 are provided with transverse openings 97 within which extends depressed portions 98 providing eyes to receive one end of the springs 99, the opposite ends being attached to a pin 100 secured in the stationary drum 26 at a point eccentric with respect to the fixed axis of the latter.

While I have described the preferred embodiment of the invention it is to be understood that I am not to be limited thereto inasmuch as changes and modifications may be resorted to without departing from the spirit of the invention as defined in the appended claims.

Having thus described my invention, I claim:

1. In a two way frictionally resisting shock absorber, a rotatable member, a friction band carried by said rotatable member and having one end fixed and the other end adjustable, a stationary member cooperating with said friction band, and independent means connected to the end portions of said friction band and operable by movement of said rotatable member for producing progressively increasing resistance to the movement of the latter in opposite directions.

2. In a two way frictionally resisting shock absorber, a rotatable member, a friction band having free ends, a stationary member cooperating with said friction band, and means connected to the end portions of said friction band and movable about a surface eccentric with respect to the axis of said rotatable member for producing progressively increasing resistance to the movement of the latter in opposite directions.

3. In a two way frictionally resisting shock absorber, a rotatable member, a friction band having free ends, a stationary drum cooperating with said friction band, pressure distributing means adjacent the end portions of said friction band, and means connected to said pressure distributing means and to said drum at a point eccentric with respect to the axis thereof, said means being operable upon movement of said rotatable member for providing progressively increasing resistance to the movement of said rotatable member in opposite directions.

4. In a two-way frictionally resisting shock absorber, a rotatable member, a friction band carried by said rotatable member and having free ends, a stationary drum cooperating with said friction band, and springs having one end connected to the respective end portions of said friction band and the other ends connected to a point eccentric with respect to the axis of said rotatable member.

5. In a two way frictionally resisting shock absorber, a rotatable member, a friction band carried by said rotatable member and having free ends, a stationary drum cooperating with said friction band, and springs having one end adjustably connected to the respective end portions of said friction band and the other ends connected to a point eccentric with respect to the axis of said rotatable member.

6. In a two way frictionally resisting shock absorber, a rotatable member, a friction band carried by said rotatable member and having free ends, a stationary drum cooperating with said friction band, and pressure exerting springs having one end connected to the respective end portions of said friction band and the other ends connected to said drum at a point eccentric with respect to the axis of said rotatable member.

7. In a two way frictionally resisting shock absorber, a rotatable member, a friction band carried by said rotatable member and having free ends, a stationary drum cooperating with said friction band, pressure distributing members adjacent the end portions of said friction band, and springs having one end connected to the respective pressure distributing members and the other ends connected to said drum at a point eccentric to the axis of said rotatable member.

8. In a two way frictionally resisting shock absorber, a rotatable member, a friction band carried by said rotatable member and having free ends, a stationary drum cooperating with said friction band and having a circumferentially extending slot, and pressure means disposed within said drum, said pressure means having a portion extending through said slot and being connected to the respective end portions of said friction band and to said drum at a point eccentric with respect to the axis of said rotatable member.

9. In a two way frictionally resisting shock absorber, a rotatable housing, a friction band having free ends, a slack take-up member secured to said friction band and having one end fixed and the other end adjustably connected to said housing, a stationary drum within said housing and cooperating with said friction band, and pressure means connected to the free end portions of said friction band and to said stationary drum at a point eccentric with respect to the axis of said rotatable housing.

10. In a two way frictionally resisting shock absorber, a rotatable housing, a friction band having free ends, a slack take-up member secured to said friction band and having one end fixed and the other end adjustably connected to said housing, a stationary drum within said housing and cooperating with said friction band, pressure distributing members adjacent the free ends of said friction band, and pressure means connected to said pressure distributing members and to said stationary drum at a point eccentric with respect to the axis of said rotatable housing.

11. In a two way frictionally resisting shock absorber, a rotatable member, a friction band having free ends, a stationary member cooperating with said friction band and means eccentrically located with respect to the axis of said stationary member and cooperating with said friction band for producing progressively increasing resistance to the movement of the latter in opposite directions.

JACOB R. SNYDER.